No. 866,029. PATENTED SEPT. 17, 1907.
J. F. HERSHEY.
WATERING HOOK FOR GIG SADDLES.
APPLICATION FILED JULY 18, 1903.
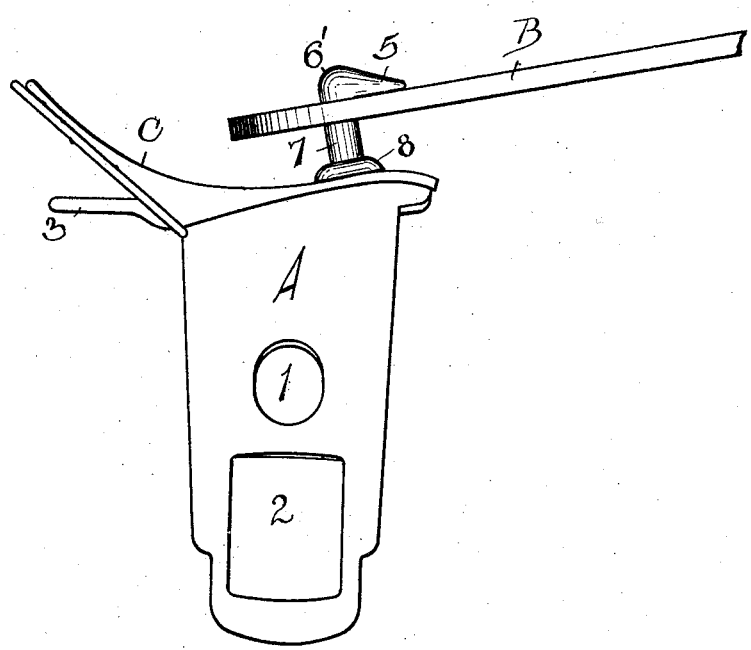
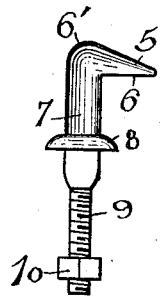
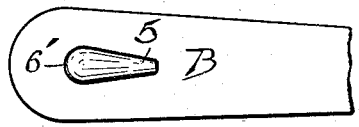
WITNESSES:
F. G. Larson
E. Smith
INVENTOR:
Jacob F. Hershey
Geo. W. Tues.
BY,
Attorney.

UNITED STATES PATENT OFFICE.

JACOB F. HERSHEY, OF OMAHA, NEBRASKA.

WATERING-HOOK FOR GIG-SADDLES.

No. 866,029.  Specification of Letters Patent.  Patented Sept. 17, 1907.

Application filed July 18, 1903. Serial No. 166,165.

*To all whom it may concern:*

Be it known that I, JACOB F. HERSHEY, residing at Omaha, in the county of Douglas and State of Nebraska, have invented certain useful Improvements in Watering-Hooks for Gig-Saddles; and I do hereby declare that the following is a full, clear, and exact description thereof, such as will enable others skilled in the art to which it appertains to make and use the same, reference being had to the accompanying drawings, which form a part of this specification.

This invention relates to a new and novel improvement in watering hooks for gig saddles.

The aim of my invention is to provide a device which shall be neat, and simple of construction and be so constructed that the over-reach strap may be readily removed though the same can not work loose under ordinary use, as will be described more fully hereinafter and finally pointed out in the claims.

In the accompanying drawings, I have shown in Figure 1 a side view of an ordinary gig saddle without the pads, provided with my watering hook. Fig. 2 discloses a side view of my watering hook, while Fig. 3 shows a top view of a broken portion of the over-reach disclosing the head of my watering hook.

To an ordinary saddle yoke A provided with the usual openings 1 and 2 and the loop 3 adapted to receive the crupper strap is secured the usual saddle C. To this saddle C, I have secured my watering hook comprising the head 5, which is provided below with the flat surface 6 as is shown in Fig. 2, the rear curved edge 6′ and the stem 7. This stem being provided with the collar 8 adapted to work upon the top of the saddle C as shown in Fig. 1, while extending therefrom the threaded stem 9 provided with an ordinary bur 10. The flat under surface 6 of head 5 which extends in the same plane throughout, forms a right angle with stem 7 which latter above collar 8 is of equal diameter throughout. Thus a flat wearing surface is provided for the over-reach strap B which thereby contacts with surface 6 throughout the latter. The upper face of head 5 is straight and extends in the same inclined plane throughout and by virtue of the curved rear edge 6¹, enables ready positioning of the over-reach strap B.

This watering hook is so secured to the saddle C that the projecting head 5 of the hook, extends towards the horses head or toward the forward end of the saddle as disclosed in Fig. 1.

The over-reach strap B is merely provided with a round perforation of a size equal to the diameter of the stem 7 so that in securing the over-reach, the operator merely grasps the end and then forces the head 5 through the perforated opening within the strap B, forcing the same over the rounded edge 6′ so that the strap is snugly held upon the stem 7. No jarring or movement of the strap B will displace this strap and in order to uncheck the animal, the end of the over reach strap B has got to be engaged to force the same over the rounded edge 6′ to release the strap. By this means I provide an exceedingly simple, strong and inexpensive watering hook which may be made of suitable sizes and of suitable material.

And having thus described my said invention, what I claim as new and desire to secure by United States Letters Patent, is:

A hook of the type set forth composed of an integral rigid stem and head, said head being composed of an under face which projects outwardly from the stem at a substantial right angle, the upper face of the head being formed in a downwardly inclined plane and connected at its rear with said shank by an arcuate portion which merges in an unbroken surface into said shank.

In testimony whereof I affix my signature in presence of two witnesses.

JACOB F. HERSHEY.

Witnesses:
 MAMIE KRECHY,
 HARRY NOTT.